United States Patent
Hoyer et al.

(10) Patent No.: US 10,545,343 B2
(45) Date of Patent: Jan. 28, 2020

(54) AUGMENTED REALITY SECURITY VERIFICATION

(71) Applicant: Assa Abloy AB, Stockholm (SE)

(72) Inventors: Philip Hoyer, Richmond (GB); Julian Eric Lovelock, Pleasanton, CA (US); Fredrik Carl Stefan Einberg, Huddinge (SE); Robert K. Rowe, Corrales, NM (US)

(73) Assignee: ASSA ABLOY AB, Stockholm (SE)

( * ) Notice: Subject to any disclaimer, the term of this patent is extended or adjusted under 35 U.S.C. 154(b) by 0 days.

(21) Appl. No.: 15/596,058

(22) Filed: May 16, 2017

(65) Prior Publication Data
US 2017/0346634 A1    Nov. 30, 2017

Related U.S. Application Data

(60) Provisional application No. 62/342,405, filed on May 27, 2016.

(51) Int. Cl.
*G06Q 20/38* (2012.01)
*G02B 27/01* (2006.01)

(52) U.S. Cl.
CPC .............................. *G02B 27/0172* (2013.01)

(58) Field of Classification Search
CPC ....... H04L 9/32; G02B 27/0172; G06F 3/011; G06Q 20/3674; G06Q 20/3821; G06T 19/006
USPC ......................................... 340/5.81; 345/633
See application file for complete search history.

(56) References Cited

U.S. PATENT DOCUMENTS

| | | | |
|---|---|---|---|
| 4,993,068 A * | 2/1991 | Piosenka ................. | G06F 21/32 235/380 |
| 2006/0092266 A1* | 5/2006 | Morgan ............. | H04N 1/32117 348/14.01 |
| 2011/0138416 A1* | 6/2011 | Kang .................... | G06F 3/0482 725/39 |

(Continued)

FOREIGN PATENT DOCUMENTS

| EP | 2 591 440 A1 | 5/2013 |
|---|---|---|
| EP | 3 033 726 | 6/2016 |

(Continued)

*Primary Examiner* — Edwin C Holloway, III
(74) *Attorney, Agent, or Firm* — Schwegman Lundberg & Woessner, P.A.

(57) ABSTRACT

Providing visual security verification includes an electronic credential of a credential holder causing credential holder information to be transmitted to an augmented reality device, superimposing the credential holder information on to a live image of an immediate environment of the augmented reality device to provide a superimposed image, where the credential holder information includes a picture of the credential holder, and providing security verification based on a comparison of the picture of the credential holder and the live image. The information may be stored in the augmented reality device and an identifier of the credential holder from the electronic credential may be used to look up the information. The information may be provided by the electronic credential to the augmented reality device. The augmented reality device may cache information for a subset of the credential holders. The information may be stored in a cloud storage device.

20 Claims, 4 Drawing Sheets

(56) References Cited

U.S. PATENT DOCUMENTS

| | | | |
|---|---|---|---|
| 2012/0019557 A1* | 1/2012 | Aronsson | G06T 11/00 345/633 |
| 2013/0044129 A1* | 2/2013 | Latta | G09G 5/00 345/633 |
| 2013/0151240 A1* | 6/2013 | Myslinski | G06F 17/20 704/9 |
| 2014/0055488 A1* | 2/2014 | Masters | G06F 3/147 345/633 |
| 2014/0210621 A1* | 7/2014 | Argue | G08B 13/22 340/568.1 |
| 2014/0344446 A1* | 11/2014 | Rjeili | H04L 43/04 709/224 |
| 2015/0206010 A1* | 7/2015 | Ueno | G06K 9/00671 345/633 |
| 2015/0221151 A1* | 8/2015 | Bacco | G07C 9/00158 340/5.83 |
| 2015/0324562 A1 | 11/2015 | Scavezze et al. | |
| 2016/0188861 A1 | 6/2016 | Todeschini | |
| 2016/0380774 A1* | 12/2016 | Lovelock | H04L 9/3247 713/169 |
| 2017/0039829 A1 | 2/2017 | Kerzner | |
| 2018/0197263 A1* | 7/2018 | Pearson | G06Q 10/00 |

FOREIGN PATENT DOCUMENTS

| | | |
|---|---|---|
| EP | 3 136 275 A1 | 3/2017 |
| WO | WO 2012/003844 A1 | 1/2012 |
| WO | WO 2015/023630 A1 | 2/2015 |

\* cited by examiner

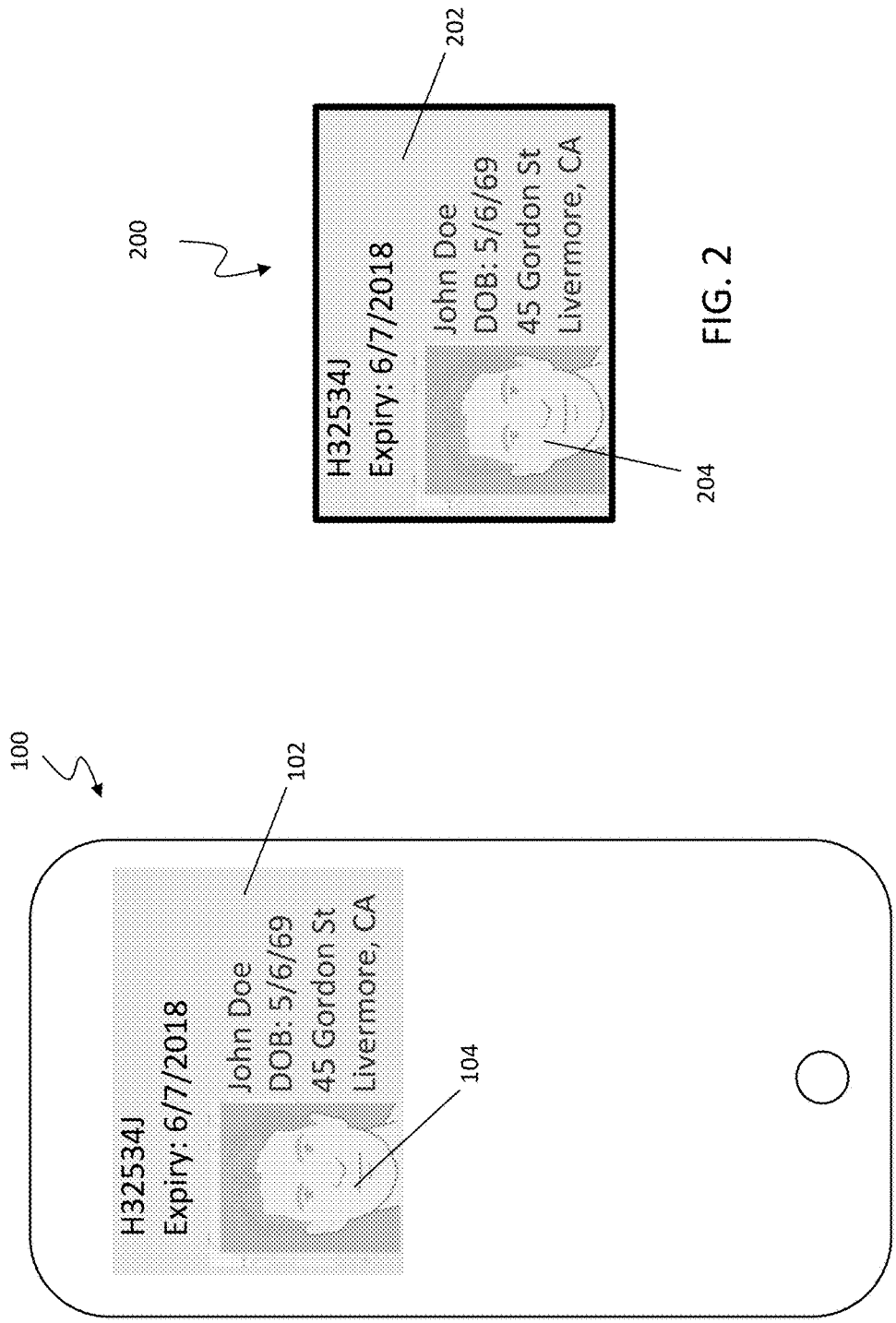

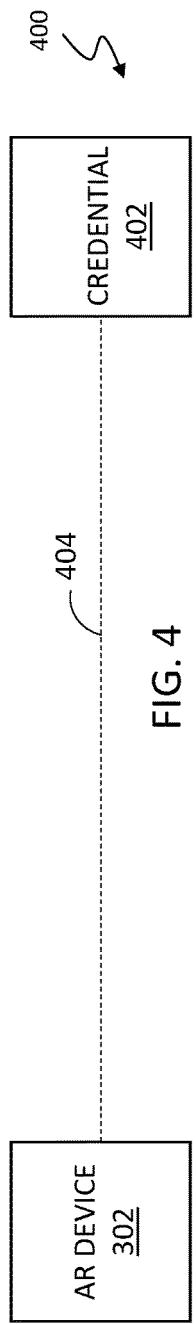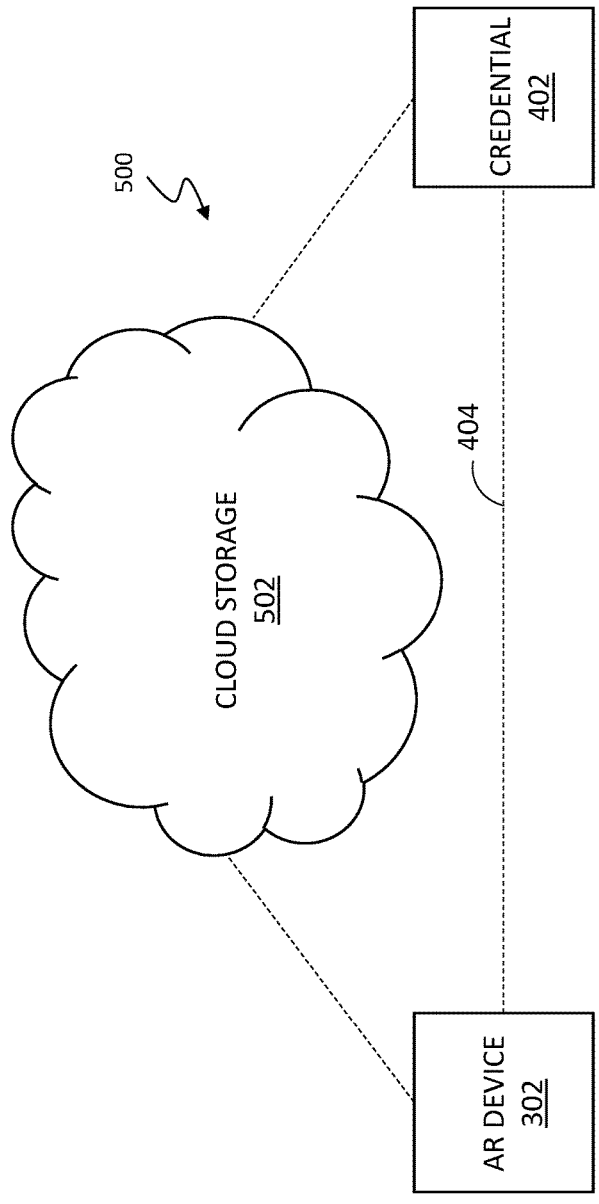

1

AUGMENTED REALITY SECURITY VERIFICATION

TECHNICAL FIELD

This application relates to the field of credentials and security and more particularly to the field of accessing credential and security information using an augmented reality device.

BACKGROUND OF THE INVENTION

Security systems often use physical cards or badges, made of plastic, cardboard, or similar, that are presented by users to security personnel at points of egress, such as an entrance to a building. A badge may include a picture of the badge holder, information about the holder and issuing authority (e.g., issuing agency, clearance level of holder, etc.) along with official indicia on the badge to deter counterfeiting (e.g., a raised seal, a pattern that is only visible by UV light, etc.). Security personnel would view the badge as the holder attempts to enter a restricted area and confirm that the picture matches the holder, the holder possesses appropriate clearance level to enter the restricted area, and that the badge is genuine.

Some of the drawbacks to badges include the fact that that a badge may be lost by the badge holder, a badge may be (improperly) retained by the holder even after the holder is no longer authorized to enter the restricted area (e.g., following termination), and a badge may be improperly altered. Some of these issues may be addressed by providing security personnel with a mechanism to confirm information visible on the badge. For example, security personnel may be provided with a computer terminal that is connected to a centralized database that shows (and confirms) information visible on a badge. In operation, a badge holder presents his badge to security personnel at a point of egress and waits while the guard confirms, on a computer screen, that the badge holder is authorized to enter the restricted area. While such a system may improve security over a visual-only inspection at a point of egress, it may result in additional delays while security personnel verify each person entering the restricted area on a computer screen.

An alternative is to provide electronic credentials that a user can carry on a mobile phone, a smart card, etc. The electronic credentials may be presented to reading devices that automatically provide egress (e.g., unlock a door). An advantage to electronic credentials is that they can be used without the need to have security personnel at each point of egress since the reading devices that cause the doors to open may be unattended. In addition, the electronic credentials can be invalidated remotely (e.g., via an over-the-air connection, by simply not providing a needed value to cause the credential to continue to operate, etc.). However, a significant disadvantage is the relative ease of improperly using the electronic credentials of another, which is improper and insecure.

Accordingly, it is desirable to provide a system that provides benefits of electronic credentials but reduces the possibilities of improperly using credentials of someone else.

SUMMARY OF THE INVENTION

According to the system described herein, providing visual security verification includes an electronic credential of a credential holder causing credential holder information to be transmitted to an augmented reality device, superimposing the credential holder information on to a live image of an immediate environment of the augmented reality device to provide a superimposed image, where the credential holder information includes a picture of the credential holder, and providing security verification based on a comparison of the picture of the credential holder and the live image. The information may be stored in the augmented reality device and an identifier of the credential holder from the electronic credential may be used to look up the information. The information may be provided by the electronic credential to the augmented reality device. The augmented reality device may cache information for a subset of the credential holders. The information may be stored in a cloud storage device. The augmented reality device may cache information for a subset of the credential holders. The augmented reality device may request the information from the cloud storage. The electronic credential may cause the information to be transferred to the augmented reality device from the cloud storage. The electronic device may be a smartphone or a smartcard. The superimposed image may include an indicator of whether the credential holder is authorized. The superimposed image may include an indicator of a biometric match between the live image and the picture of the credential holder.

According further to the system described herein, computer software, provided in a non-transitory computer readable medium, provides visual security verification. The software includes executable code that implements the method of one of the preceding claims.

The system described herein uses an augmented reality (AR) headset (or similar device) that is worn by a security guard or an employee that is employed as part of the security function of a building (e.g. in the lobby) to recognize authorized personnel and to distinguish between authorized personnel and unauthorized personnel. Authorized personnel may carry a credential on their smartphone that can be frictionlessly retrieved (phone stays in pocket). After verification by the AR headset, the headset would display a picture of the person the guard or employee is viewing. The system may use conventional virtual reality and augmented reality systems, such as Oculus Rift (owned by Facebook), HTC Vive, Microsoft Hololens and/or Google Glass that are adapted to provide the functionality described herein. For example, the MS Hololens system may be used by security guards at buildings to check on people with Seos Mobile credentials or BLE fobs or in temporary perimeter situations such as emergency situations where people need to create temporary secure zones and allow only approved personnel such as first responders.

End user value may be increased by the ability to use the system in an outdoor situation and potentially from a distance to recognize authorized personnel without having to inspect a badge or a goID credential in vicinity of the checked person. Additionally, the Hololens device (or similar) may allow the wearer to be completely hands free. Thus, id information is moved to phones that represent a virtual badge where the virtual badge is displayed in the hololens to a guard. Note that such a system may overcome a current hurdle in adoption of Mobile Access solutions because the system addresses an issue of the security team not having any badges to visually check. It is also possible to use Seos Identities in Virtual/Augmented Reality environments, especially potentially multi company shared virtual work spaces.

The system described herein may provide disruptive access control architectures & credential technologies and has a potential to replace established PACS and IdA solutions (i.e. cards and readers). The system may offer a hands free solution for a security guard to recognize authorized personnel of a company. Additionally, the system may add facial biometrics via the hololens in a built camera to augment the capability of a guard to recognize a person. The system may also be used in GovID in conjunction with goID.

The system described herein has the following components:

a. A database of all enrolled employees that contains pictures of all employees. In some instances, the system may also capture a facial biometric template for each employee.

b. A virtual credential such as an HID Mobile Access/goID that is carried on each employee's Smartphone. The smartphone may have a wireless interface such as Bluetooth Smart (BLE) for transmitting the credential or at least a pseudonymous authenticated credential identifier (either in the advertisement of the wireless interface or as an answer to a request to the ID).

c. An augmented reality (AR) headset that has at least a wireless interface capable of interacting with the above virtual credential to retrieve the ID of the credential, optionally retrieve the complete credential including the biometric template, optionally a camera, optionally enough memory to store the complete database of all employees that need to be verified, and optionally enough processor capability to run a facial matching algorithm.

In an embodiment that does not employ facial biometrics, the AR headset contains a component and a wireless interface allowing the AR headset to retrieve the credential ID (e.g., a Seos Trusted ID). A database is provided that contains all enrolled authorized personnel including pictures thereof and additional information such as name, last name and title. The system also includes a component that would allow the operator to render a picture of the authorized personnel and related data on the augmented reality display. The user would have a credential either on a mobile phone or a dedicated device (e.g. Bluetooth smart fob) that is capable via the wireless interface to transmit the credential or a trusted ID to the AR headset without user interaction. That is, the phone could stay in the pocket of the user. Transmission of the trusted ID may be triggered by the AR headset and the credential coming into transmission range or alternatively the credential could advertise the trusted ID at regular intervals. In this embodiment, the AR headset could display the picture of the authorized personnel corresponding to the trusted ID that was transmitted and the wearer of the headset (operator) would be able to do a visual comparison between the picture and the person in front of them.

In a different embodiment, the headset could additionally contain a camera and a component capable of matching facial biometrics. In this scenario, the headset would match the person against a facial biometric template in a local database referenced by the trusted ID that was transmitted. After performing a match, the headset would display a score next to the picture, display a visual indicator of the person/people matched successfully (e.g. tick, or green halo . . . ), and/or recognize all people in field of view and display with a visual indicator the person/people that did not match any of the templates (e.g. red arrow, an "X", etc.).

In some cases, the headset might not have the computing capability to match all people in view. One option for addressing this is to match only a person in the center of the view field (the person that the headset wearer is viewing). In some cases, if a person is found in the building that does not belong there (e.g. via other systems or means, for example video surveillance or an explicit indication of a security situation in another part of the building) the AR headset could indicate this to the wearer. The AR headset could show a map or a visual indicator in field navigation for the wearer to get to the incident location and/or visually 'remove' the walls and display a video feed of what is happening (potentially transmitted from the surveillance camera at the incident location).

In some embodiments, the AR headset may not have enough storage resources to store a full DB of all the employees and pictures thereof. This may be addressed by having one or more (a low res small size and a high res larger size) and optionally the facial template stored on the credential (smart phone, fob, etc.) carried by the personnel. At a specific relatively long distance, the credential starts transmitting the picture to the AR headset. By the time the person is relatively close to the headset wearer, the transmission is expected to have completed and the comparison happens as described above. In the case where two pictures are used for speed improvement, first the low res picture is transmitted, allowing an initial comparison/assessment followed by the high res picture for more exacting comparison. Note that multiple people could be in range could all be transmitting pictures/templates to the headset so it may be useful if the headset is capable of storing a few pictures at the same time.

Another possibility if the AR headset does not have enough storage resources to store a full DB of all the employees and their pictures, is to store the pictures/templates in the cloud. In this scenario, the AR headset may have a wireless network connection to a cloud server. When a trusted ID is received, the AR headset would then request the picture/template from the cloud server. Additionally the AR Headset could have a local cache of picture templates that is capped based on available memory where the AR headset would store the pictures/templates that had previously been received in an order based on time (e.g., a cache of the last 50 people). When a new person is seen, the picture/template may be loaded from the cloud and the oldest seen picture/template may be deleted from the cache.

BRIEF DESCRIPTION OF THE DRAWINGS

Embodiments of the system described herein are explained with reference to the several figures of the drawings, which are briefly described as follows.

FIG. 1 is a schematic illustration showing a smartphone credential according to an embodiment of the system described herein.

FIG. 2 is a schematic illustration showing a smartcard credential according to an embodiment of the system described herein.

FIG. 4 is a schematic illustration showing communication between an augmented reality device and an electronic credential according to an embodiment of the system described herein.

FIG. 5 is a schematic illustration showing communication between an augmented reality device, an electronic credential, and cloud storage according to an embodiment of the system described herein.

DETAILED DESCRIPTION OF VARIOUS EMBODIMENTS

Figure 3:
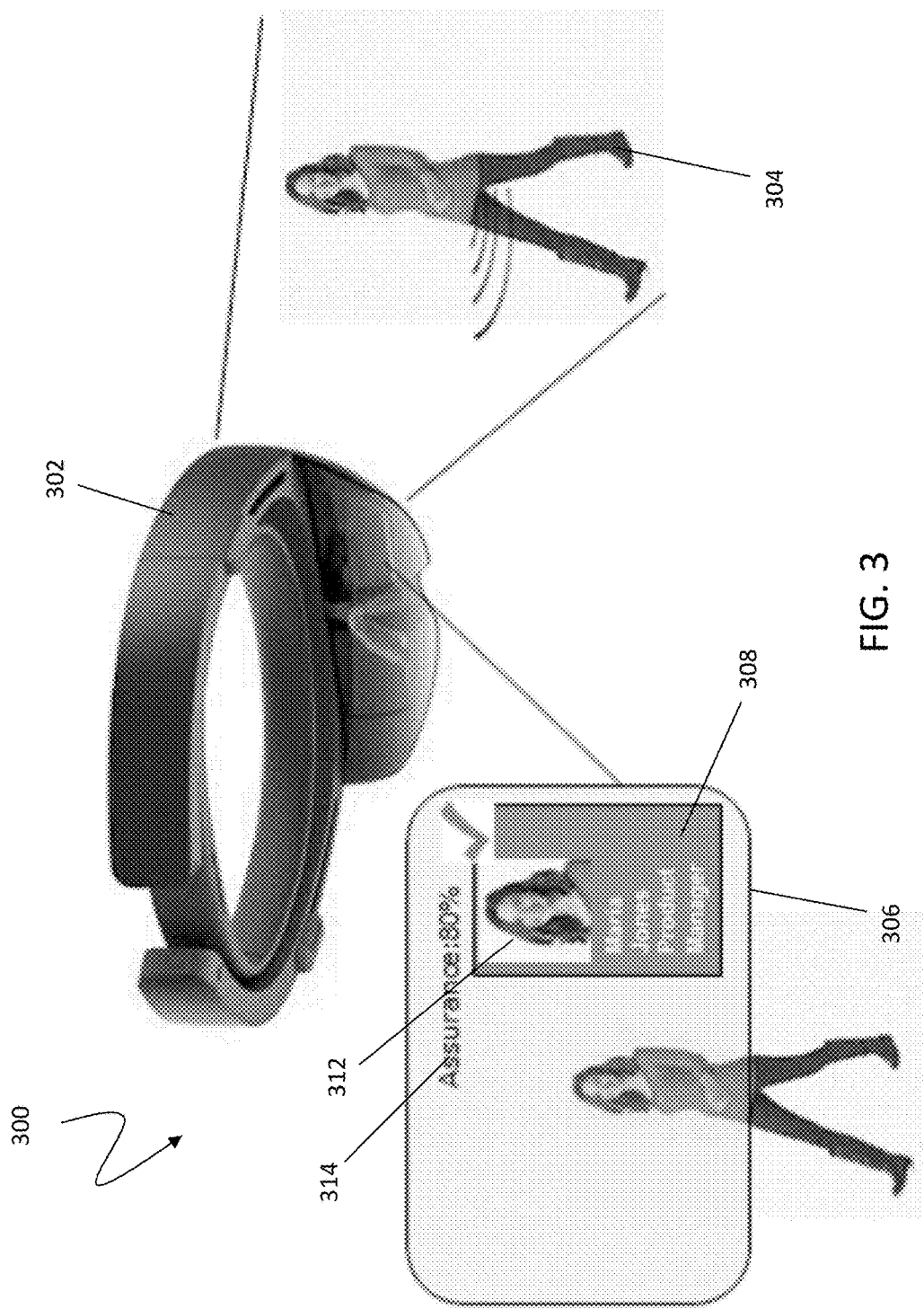
FIG. 3 is a schematic illustration showing an augmented reality device and a credential holder according to an embodiment of the system described herein.

The system described herein provides a mechanism to show an image on an augmented reality device that superimposes a live image of a credential holder with information about the credential holder, including a picture thereof. Information about the credential holder is caused to be provided to the augmented reality device by an electronic credential such as a smartphone or a smartcard that may remain in a pocket, handbag, briefcase, etc. of the credential holder during operation.

Referring to FIG. 1, a smartphone 100 is shown as including credential information 102, which may correspond to the user/owner of the smartphone 100. The credential information 102 may be standard credential information, such as a serial number, a picture of the credential holder 104, address information, expiration information, etc. The credential information 102 may be stored electronically on the smartphone 100 and may include other, non-visual, information, such as a digital signature, a checksum, etc. In some instances, at least some of the additional information may be used to verify the electronic credential information 102. For example, a digital signature of a trusted authority (e.g., authority that issued credentials) may be provided as part of the credential information 102.

As described in more detail elsewhere herein, the picture of the credential holder 104 may be transmitted to an augmented reality (AR) device, or similar, used by a security guard as the credential holder (the user/owner of the smartphone 100) approaches the security guard. Information transmitted may also include an indication of authorization of the credential holder, possibly the name of the credential holder, and other information that is potentially useful to the security guard. As explained in more detail elsewhere herein, in some instances, the picture of the credential holder 104 and/or the other information may not be transmitted directly from the smartphone 100 to the AR device of the security guard but, instead, the smartphone 100 may simply provide an identifier/indication that causes release from another entity (e.g., cloud storage, the AR device, etc.) of information about the credential holder.

Referring to FIG. 2, a smartcard 200 stores credential information 202 that may include a serial number, a picture of the credential holder 204, address information, expiration information, etc. Note that the smartcard 200 represents any type of device capable of securely storing and communicating credential information, such as a secure fob. Unlike the smartphone 100, the smartcard 200 may not include native display capability, but the credential information stored therein is transmitted in a manner similar to transmission of the credential information stored in the smartphone 100. The smartcard 200 may be a SEOS mobile credential.

Referring to FIG. 3, a diagram 300 shows an augmented reality (AR) device 302 that may be worn by a security guard (or similar) in connection with inspecting credential holders. The AR device 302 may be an Oculus Rift device (provided by Facebook), an HTC Vive device, a Microsoft Hololens and/or a Google Glass device. The AR device 302 provides an augmented reality experience where the operator is provided with a visual image that includes a live image of the immediate environment with additional images/information superimposed thereon.

In operation, a camera (not shown) on a front portion of the AR device 302 captures a person 304 in proximity to the AR device 302. Capturing the person 304 may be triggered by proximity to the AR device 302 of the person 304 and/or by proximity of an electronic credential such as smartphone, smartcard, fob, etc. (not shown in FIG. 3) like the smartphone 100 and the smartcard 200 described elsewhere herein. In other embodiments, the system may be triggered by proximity of the credential holder to a specialized reader/detector. In some embodiments, the electronic credential 402 causes the trigger. The electronic credential may be in a pocket of the person 304 or, in other instances, be otherwise carried by the person (i.e., in a handbag, a briefcase, etc.). As described in more detail elsewhere herein, the electronic credential causes information to be displayed to the operator of the AR device 302, such as a security guard, that facilitates a security decision by the operator.

The AR device 302 provides an image on a display 306 thereof that includes a live image of the immediate environment, which in this case is the person 304 captured by the camera of the AR device 302. The display 306 also shows security information 308 superimposed on the live image. In the example of FIG. 3, the security image 308 includes a name and position of the person 304 as well as a picture 312 thereof. In addition, in some embodiments, the display 306 may also include results 314 of applying facial recognition algorithms to compare the face of the person 304 to the face in the picture 312. This is described in more detail elsewhere herein. It is also possible to provide indicia indicating authorization of a credential holder (e.g., a green check, a halo, etc.) or lack of authorization (e.g., a red check, an "X", etc.). In instances where there are a number of credential holders within range, the AR device 302 may superimpose information on the display 306 based on which of the credential holders is closest to a center portion of the display 306. Alternatively, the AR device 302 may superimpose information on the display 306 for all of the credential holders that can be seen in the display 306.

In some embodiments, the credential holder does not need to remove or present the electronic credential so that, for example, a security guard may simply turn their head toward an individual to cause information for that individual to be superimposed on the display 306 without the credential holder needing to take any affirmative steps or possibly even be aware. Alternatively, an individual may need to appear on a specific position of the glass for personal information or status of the individual to be superimposed on the display 306. Thus the security guard may look to the side of the individual to have the personal information of the individual appear. Note also that the system may be used anywhere, including outside, and is not restricted to being used at points of egress. Note also that a security guard may use the system hands free (i.e., without needing to use their hands). The system may use a biometric template and conventional biometrics detection/matching to determine a degree of similarity between the live image of the credential holder and the picture thereof, thus reducing the opportunity for someone to use an electronic credential of another.

Referring to FIG. 4, the AR device 302 is shown communicating with an electronic credential 402, such as smartphone, smartcard, fob, etc. like the smartphone 100 and the smartcard 200, described elsewhere herein. Communication between AR device 302 and the electronic credential 402 may be provided via a communication path 404 that uses any appropriate protocol, such as BLE (Bluetooth Low Energy) or any one or combination of wireless protocols. Note that any number of conventional wireless communication protocols may be used to provide the functionality described herein.

In some embodiments, all of the information superimposed on the display 306 is transmitted from the electronic credential 402 to the AR device 302. In such a case, the AR device 302 does not need to retain any information about credential holders. However, the exchange of information may include security/verification steps. For example, even if all of the information superimposed on the display 306 is transmitted from the electronic credential 402 to the AR device 302, the information may be digitally signed with a private key of the electronic credential 402 where the digital signature is verified by a corresponding public key stored by the VT device 302. In some cases, it may be possible to efficiently use transmission bandwidth by having the electronic credential 402 first transmit a low resolution picture to the AR device 302 while the credential holder is relatively far away from the AR device 302. The electronic credential 402 subsequently transmits a high resolution picture to the AR device 302 only if the electronic credential 402 is within a pre-defined distance from the AR device 302.

In some embodiments, some or all of the information superimposed on the display 306 is natively stored by the AR device 302. In such a case, the electronic credential 402 may simply provide an identifier for the credential holder and the AR device 302 may use the identifier to access an internal database thereof to retrieve appropriate information about the credential holder (e.g., name, picture, etc.). It is also possible to have a hybrid system where some of the information is stored with the electronic credential 402 and other information is stored with the AR device 302.

Referring to FIG. 5, a diagram 500 illustrates a system in which at least some of the information for the credential holder is stored in a cloud storage 502. In some embodiments, the AR device 302 requests credential holder information from the cloud storage 502. In other instances, the electronic credential 402 may send a signal to the cloud storage 502 to cause the cloud storage 502 to push data to the AR device 302. Note that, just as with data exchanges in connection with the embodiments illustrated in FIG. 4, appropriate security operations may be performed to authorize data exchanges with the cloud storage 502.

In cases where the VT device 302 is not be able to store information for all of the credential holders in a system, the VT device 302 may still cache information for a subset of the credential holders. The caching may be based on a last N credential holders viewed by the AR device 302, or data may be cached based on some other appropriate criteria. For example, the AR device 302 may download and cache credential holders that work in a particular area (e.g., a particular building) when the AR device 302 is located in the same building.

In some embodiments, it may be possible to transmit intruder information to the AR device 302, such as feed from a camera viewing the intruder, a map indicating location of the intruder, etc. In such a case, it may be possible to provide the operator with a view that "removes" walls to provide appropriate information to the operator.

Figure 6:
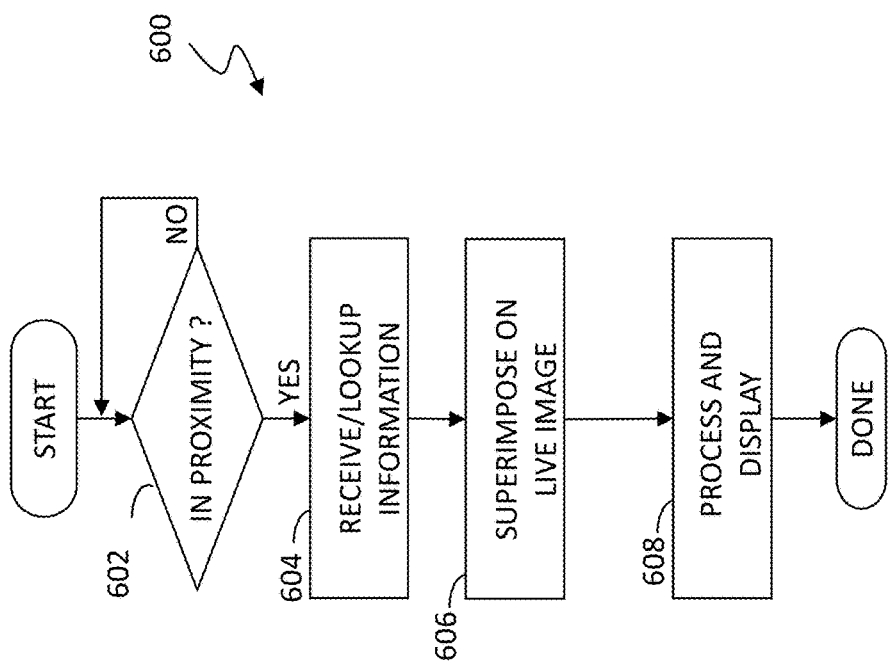
FIG. 6 is a flow diagram illustrating processing performed in connection with an augmented reality device according to an embodiment of the system described herein.

Referring to FIG. 6, a flow diagram 600 illustrates steps performed by the system described herein. Processing begins at a first step 602 where it is determined if an electronic credential is in proximity to a AR device (and/or a special reader, as described elsewhere herein). If not, then processing returns to the step 602 to continue polling/waiting. Otherwise, control transfers from the step 602 to a step 604 where the AR device either receives information about the credential holder corresponding to the proximal electronic credential or the AR device looks up and internally retrieves the information. This information may include the geolocation of the credential in either absolute terms, or relative to the geolocation of the AR device. Following the step 604 is a step 606 where the AR device superimposes the information on to a live image, as described elsewhere herein. Following the step 606 is a step 608 where the AR device displays the image (with the superimposed information) and possibly performs other processing, such as scoring the biometric match, providing a green or red check mark, etc. Following the step 608, processing is complete.

Various embodiments discussed herein may be combined with each other in appropriate combinations in connection with the system described herein. Additionally, in some instances, the order of steps in the flowcharts or flow diagrams may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable storage medium and executed by one or more processors. The computer readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible storage medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only.

What is claimed is:

1. A method of providing visual security verification, comprising:
    an electronic credential of a credential holder causing credential holder information to be transmitted from the electronic credential to an augmented reality device, including transmission, at a first distance of the electronic credential from the augmented reality device, of a first picture of the credential holder having a first resolution, and transmission, at a second distance of the electronic credential from the augmented reality device that is shorter than the first distance, of a second picture of the credential holder having a second resolution that is greater than the first resolution;
    superimposing at least a portion of the credential holder information on to a live image of an immediate environment of the augmented reality device to provide a superimposed image, wherein the at least portion of credential holder information includes the second picture of the credential holder; and
    providing security verification based on a comparison of the second picture of the credential holder and the live image.

2. A method, according to claim 1, wherein other credential holder information is stored in the augmented reality device and an identifier of the credential holder from the electronic credential is used to look up the other credential holder information.

3. A method, according to claim 1, wherein the augmented reality device caches credential holder information for a plurality of the credential holders.

4. A method, according to claim 1, wherein at least some of the credential holder information is stored in a cloud storage device.

5. A method, according to claim 4, wherein the augmented reality device caches credential holder information for a subset of the credential holders.

6. A method, according to claim 4, wherein the augmented reality device requests the at least some of the credential holder information from the cloud storage.

7. A method, according to claim 4, wherein the electronic credential causes the at least some of the credential holder information to be transferred to the augmented reality device from the cloud storage.

8. A method, according to claim 1, wherein the electronic credential is one of: a smartphone or a smartcard.

9. A method, according to claim 1, wherein the superimposed image includes an indicator of whether the credential holder is authorized.

10. A method, according to claim 1, wherein the superimposed image includes an indicator of a biometric match between the live image and the second picture of the credential holder.

11. A method, according to claim 1, wherein the augmented reality device is worn on a head of a user.

12. A method, according to claim 11, wherein the augmented reality device displays the superimposed image in a line of sight of the user.

13. A non-transitory computer-readable medium containing software that provides visual security verification, the software comprising:

executable code that receives credential holder information transmitted from an electronic credential to an augmented reality device, including receiving a first picture of a credential holder having a first resolution, the first picture transmitted when the electronic credential is a first distance from the augmented reality device, and receipt of second picture of the credential holder having a second resolution that is greater than the first resolution, the second picture transmitted when the electronic credential is a second distance from the augmented reality device that is shorter than the first distance;

executable code that superimposes at least a portion of the credential holder information that includes the second picture of a credential holder on to a live image of an immediate environment of the augmented reality device to provide a superimposed image; and executable cod that provides security verification based on a comparison of the second picture of the credential holder and the live image.

14. A non-transitory computer-readable medium, according to claim 12, wherein other credential holder information is stored in the augmented reality device and an identifier of the credential holder from the electronic credential is used to look up the other credential holder information.

15. A non-transitory computer-readable medium, according to claim 13, wherein at least some of the credential holder information is stored in a cloud storage device.

16. A non-transitory computer-readable medium, according to claim 15, wherein the electronic credential causes the at least some of the credential holder information to be transmitted to the augmented reality device from the cloud storage device.

17. A non-transitory computer-readable medium, according to claim 13, wherein the superimposed image includes an indicator of whether the credential holder is authorized.

18. A non-transitory computer-readable medium, according to claim 13, wherein the superimposed image includes an indicator of a biometric match between the live image and the second picture of the credential holder.

19. A non-transitory computer-readable medium, according to claim 12, wherein the augmented reality device is worn on a head of a user.

20. A non-transitory computer-readable medium, according to claim 19, wherein the augmented reality device displays the superimposed image in a line of sight of the user.

* * * * *